(12) United States Patent
Singhal et al.

(10) Patent No.: US 11,190,105 B1
(45) Date of Patent: Nov. 30, 2021

(54) SINGLE INDUCTOR MULTIPLE OUTPUT REGULATOR

(71) Applicant: Texas Instruments Incorporated, Dallas, TX (US)

(72) Inventors: Vipul Kumar Singhal, Bangalore (IN); RR Manikandan, Bangalore (IN); Rajat Chauhan, Bangalore (IN); Vinod Joseph Menezes, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/119,862

(22) Filed: Dec. 11, 2020

(51) Int. Cl.
| | |
|---|---|
| *H02M 1/08* | (2006.01) |
| *H02M 3/157* | (2006.01) |
| *H02M 3/158* | (2006.01) |
| *H02M 1/00* | (2006.01) |

(52) U.S. Cl.
CPC ........... *H02M 3/1584* (2013.01); *H02M 1/08* (2013.01); *H02M 3/157* (2013.01); *H02M 1/0009* (2021.05)

(58) Field of Classification Search
CPC ...... H02M 1/0009; H02M 1/08; H02M 3/156; H02M 3/157; H02M 3/158; H02M 3/1584
USPC .............................................. 307/31, 38, 39
See application file for complete search history.

(56) References Cited

U.S. PATENT DOCUMENTS

| | | | | |
|---|---|---|---|---|
| 10,615,696 | B2 * | 4/2020 | Jung | .................... H02M 3/1582 |
| 2004/0136207 | A1 * | 7/2004 | Havanur | ........... H02M 3/33592 363/21.06 |
| 2004/0201281 | A1 * | 10/2004 | Ma | ........................ H02M 3/158 307/38 |
| 2008/0231115 | A1 * | 9/2008 | Cho | ....................... H02M 3/158 307/41 |
| 2012/0169307 | A1 * | 7/2012 | Chen | ..................... H02M 3/158 323/271 |
| 2013/0082668 | A1 * | 4/2013 | Tseng | .................... H02M 3/158 323/267 |
| 2013/0234513 | A1 * | 9/2013 | Bayer | ..................... G05F 1/577 307/31 |
| 2016/0351247 | A1 | 12/2016 | Vyavahare et al. | |
| 2017/0271990 | A1 * | 9/2017 | Knoedgen | ............. H02M 3/158 |

OTHER PUBLICATIONS

Hanh-Phuc Le et al., "A Single-Inductor Switching DC-DC Converter With Five Outputs and Ordered Power-Distributive Control" IEEE Journal Of Solid-State Circuits, vol. 42, No. 12, Dec. 2007, 12 pages.

(Continued)

*Primary Examiner* — William Hernandez
(74) *Attorney, Agent, or Firm* — Michael A. Davis, Jr.; Charles A. Brill; Frank D. Cimino

(57) ABSTRACT

An electronic device having multiple power output circuits that individually include a switch control input, a bypass control input, an output transistor and an output control circuit that includes an RC circuit with a resistor and a capacitor coupled to the output transistor gate and a bypass switch in parallel with the RC circuit resistor. The electronic device includes a controller that selects one of the power output circuits for a given power transfer cycle, closes the bypass switch to bypass the resistor of the selected power output circuit and turns the output transistor of the selected power output circuit on to transfer current from the inductor to a load of the selected power output circuit.

20 Claims, 5 Drawing Sheets

(56) References Cited

OTHER PUBLICATIONS

Dongsheng Ma et al., "A Single-Inductor Multiple-Output Switching Converters With Time-Multiplexing Control in Discontinuous Conduction Mode" IEEE Journal of Solid-State Circuits, vol. 38, No. 1, Jan. 2003, 12 pages.

Dongsheng Ma et al., "A Pseudo-CCM/DCM SIMO Switching Converter With Freewheel Switching" IEEE Journal of Solid-State Circuits, vol. 38, No. 6, Jun. 2003, 8 pages.

\* cited by examiner

SINGLE INDUCTOR MULTIPLE OUTPUT REGULATOR

BACKGROUND

Multiple output power converters are useful in small low-power systems that include multiple components or modules that need different supply voltages. These systems are often supplied by a single power source, such as a battery. Single inductor, multiple output (SIMO) power converters use switches and an inductor to deliver output power to multiple output loads as charge-packets conducted through output transistor switches turned on one output at a time. Field effect transistors (FETs) can be used for the output switching, such as n-channel (e.g., NFET) or p-channel (e.g., PFET) transistors. N-channel transistors can be used as the output transistor switches, but the gate control signals must be generated at voltages higher than the output voltage. Adding charge-pump or specialized bootstrap circuits increases the circuit size, cost and complexity. It is desirable for the non-selected output transistor switches to have low leakage current during charge transfer to a different selected output channel. To avoid leakage due to reverse bias, the output FETs may have substrate connections switched for connection to a shared power node when conducting and to the associated output when not conducting. However, many technologies do not allow for substrate bias switching for n-channel transistors. Using p-channel output transistors avoids the need for a charge pump or bootstrapping circuits, for example, allowing the gates to be driven by the highest output or each channel gate to be driven by its own output voltage. Also, n-channel output transistor switches have no additional constraints on transistor reliability and many p-channel processes allow substrate connection switching to reduce or mitigate reverse biasing.

In boost type SIMO converters, however, the use of p-channel output transistor switches presents a timing problem in controlling the turn off of a low side shared charging switch (typically an n-channel transistor) relative to turning on the selected output transistor switch. This configuration does not allow an overlap when both the low side charging switch and the selected output transistor switch are both on to avoid shorting the selected output to ground or other low side switch reference. Conversely, providing a gap between turning the low side switch charging switch off and turning the selected output transistor switch on leaves the converter inductor disconnected during the time gap, which causes the voltage of the shared output node (e.g., the drain of the n-channel low side switch) to overshoot. The voltage rise at the shared output node can cause unintended turn on of non-selected output transistor switches through rising PFET source voltage relative to the gate. This unintended turn on leads to cross regulation of the output voltages or can cause the non-selected output to go out of regulation and even rise to a voltage beyond the maximum specification of the associated load. This condition may not affect output voltage regulation where the load current on each output is continuous and higher than the injected current, but that situation is not common, particularly for ultralow-power systems, such as internet of things smart sensors where the load may be heavily duty-cycled.

SUMMARY

Described examples provide power conversion systems and electronic devices (e.g., integrated circuits) with multiple outputs and output control circuits that includes an RC circuit with a resistor and a capacitor coupled to an output transistor gate and a bypass switch in parallel with the RC circuit resistor. A controller selects one of the power output circuits for a given power transfer cycle, closes the bypass switch to bypass the resistor of the selected power output circuit and turns the output transistor of the selected power output circuit on to transfer current from the inductor to a load of the selected power output circuit. The RC circuits facilitate non-overlapping control to turn a charging transistor off before turning a selected output transistor on to avoid shorting the selected output to ground or other low side switch reference, while using the self-timed rise in the common or shared node voltage to boost the gate voltage of the non-selected output transistors to mitigate or prevent undesired turn on and resultant leakage and cross regulation in multiple output converters.

In one aspect, an electronic device includes first and second outputs adapted to be coupled to respective first and second loads, a transistor, first and second output circuits and a controller. The transistor has a source coupled to a reference voltage and a drain. The respective output circuits include a switch control input, a bypass control input, an output transistor and an output control circuit. The sources of the output transistor of the respective output circuits are coupled to the drain of the transistor. The drains of the first and second output transistors are coupled to the respective first and second outputs. The respective output control circuits have a resistor, a switch and a capacitor. The resistor and the switch are coupled in parallel with one another between a respective switch control input and the gate of the respective output transistor. The capacitor is coupled between the source of the respective output transistor and the gate of the respective output transistor. The controller has first and second switch control outputs, as well as first and second bypass control outputs. The first switch control output is coupled to the first switch control input, the first bypass control output is coupled to the first bypass control input, the second switch control output is coupled to the second switch control input and the second bypass control output is coupled to the second bypass control input.

In certain examples, the respective output transistors are p-channel field effect transistors, and the transistor is an n-channel field effect transistor. In certain examples, the respective output circuits include two or more output transistors coupled in series between the respective output and the shared or common node at the drain of the transistor, with gates coupled together.

In certain examples, the controller is configured for a power transfer cycle that transfers current from the inductor to the first output, to: generate a first bypass control signal that close the first switch at the first bypass control output; generate a second bypass control signal that keeps the second switch open at the second bypass control output; generate a first switch control signal that turns the first output transistor on at the first switch control output; and generate a second switch control signal that keeps the second output transistor off at the second switch control output. For a second power transfer cycle that transfers the current from the inductor to the second output, the controller is configured to generate the first bypass control signal that keeps the first switch open at the first bypass control output; generate the second bypass control signal that closes the second switch at the second bypass control output; generate the first switch control signal that keeps the first output transistor off at the first switch control output; and generate the second switch control signal that turns the second output transistor on at the second switch control output.

In certain implementations, the controller comprises a charging switch control output that is coupled to the gate of the transistor. The controller is configured, for the respective power transfer cycles, to generate a charging control signal at the charging switch control output that turns the transistor on for a non-zero time and then turns the transistor off responsive to a detected peak current of the inductor. In a power transfer cycle that transfers the current from the inductor to a selected output channel and an associated one of the outputs, the controller is configured to: generate, at the bypass control output of the selected channel, the bypass control signal that closes the switch of the selected channel during the power transfer cycle from a time during which the charging control signal turns the transistor on until a time during which the switch control signal turns the output transistor of the selected channel on; generate, at the bypass control output of the non-selected channel, the bypass control signal that keeps the switch of the non-selected channel open; generate, at the switch control output of the selected channel, the switch control signal that turns the output transistor of the selected channel on a non-zero delay time after the charging control signal turns the transistor off; and generate, at the switch control output of the non-selected channel, the switch control signal that keeps the output transistor of the non-selected channel off.

In another aspect, a power conversion system comprises an input; an inductor coupled to the input; first and second outputs; a transistor; first and second output circuits; and a controller. The transistor has a source coupled to a reference voltage and a drain. The respective output circuits include a switch control input, a bypass control input, an output transistor and an output control circuit. The sources of the output transistor of the respective output circuits are coupled to the drain of the transistor. The drains of the first and second output transistors are coupled to the respective first and second outputs. The respective output control circuits have a resistor, a switch and a capacitor. The resistor and the switch are coupled in parallel with one another between a respective switch control input and the gate of the respective output transistor. The capacitor is coupled between the source of the respective output transistor and the gate of the respective output transistor. The controller has first and second switch control outputs, as well as first and second bypass control outputs. The first switch control output is coupled to the first switch control input, the first bypass control output is coupled to the first bypass control input, the second switch control output is coupled to the second switch control input and the second bypass control output is coupled to the second bypass control input.

A further aspect provides a method that comprises, in a power transfer cycle of power conversion system with multiple output channels: selecting an output channel; turning a charging transistor on to charge an inductor; while the charging transistor is turned on, turning a bypass switch of the selected channel on to bypass a gate control circuit resistor of the selected channel; and after turning the bypass switch of the selected channel on, turning the charging transistor off. The method further comprises, after turning the bypass switch of the selected channel on, turning an output transistor of the selected output channel on to transfer current from the inductor to a load of the selected output channel; after the output transistor of the selected output channel is turned on, turning the bypass switch of the selected channel off; and turning the output transistor of the selected output channel off responsive to a detected zero current of the inductor. In one example, the method comprises turning the output transistor of the selected output channel on to transfer the current from the inductor to the load of the selected output channel a non-zero delay time after turning the charging transistor off. In one example, the method comprises turning the bypass switch of the selected channel off before turning the output transistor of the selected output channel off.

DETAILED DESCRIPTION

Figure 1:
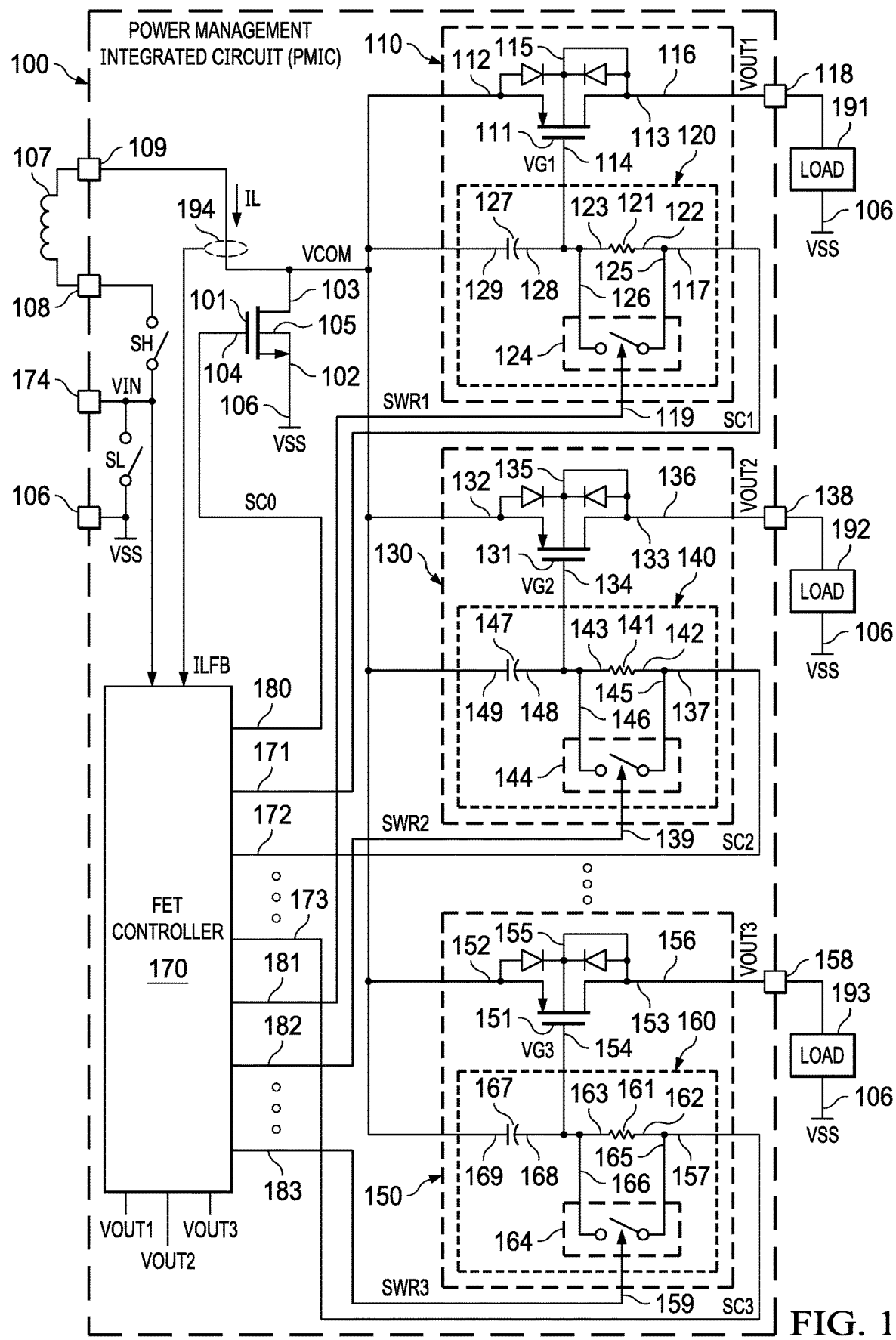
FIG. 1 is a schematic diagram of a single inductor, multiple output (SIMO) power system with a power management integrated circuit (PMIC) having low leakage output circuits.

In the drawings, like reference numerals refer to like elements throughout and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Figure 2:
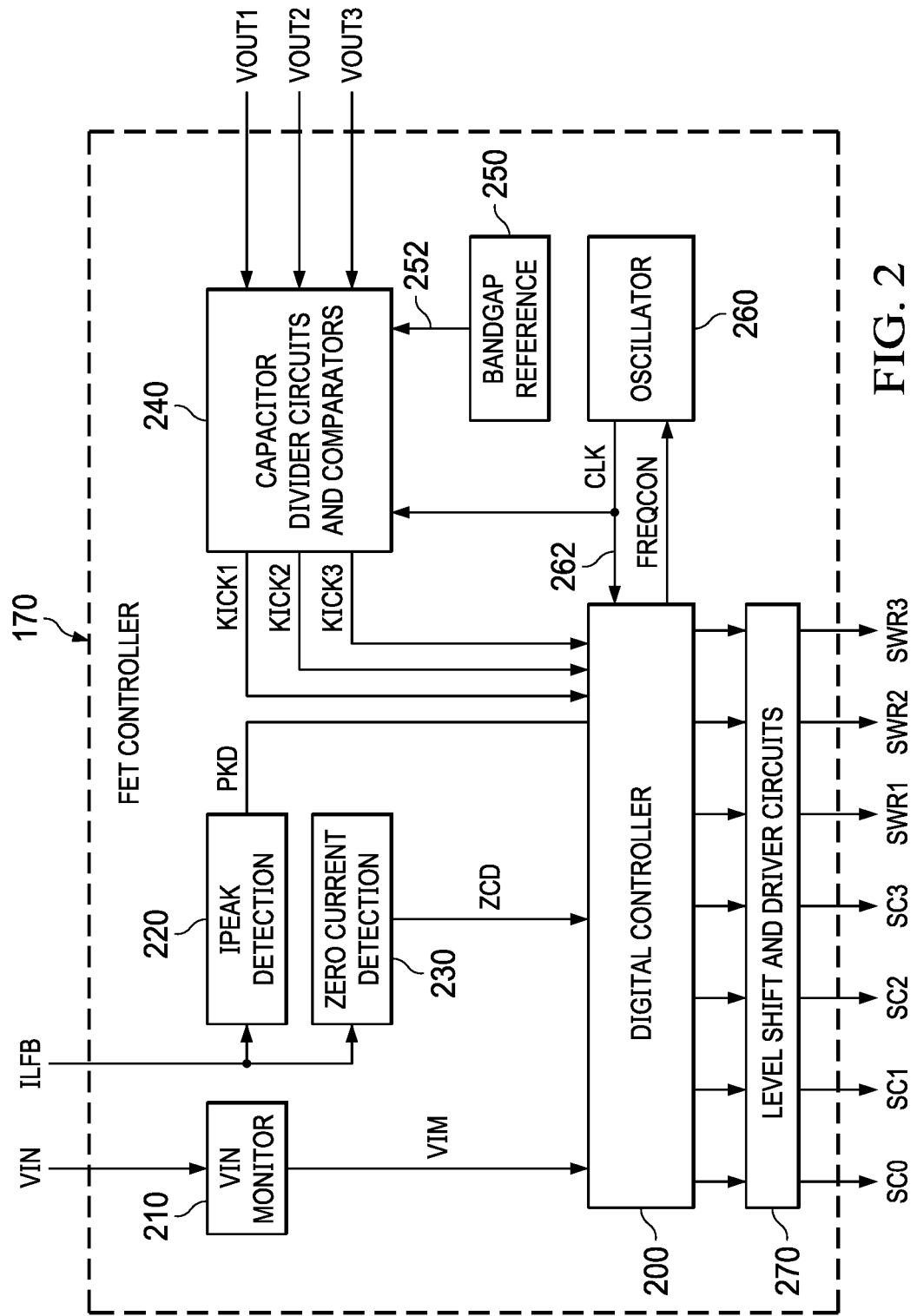
FIG. 2 is a schematic diagram of an example controller in the PMIC of FIG. 1.
Figure 3:
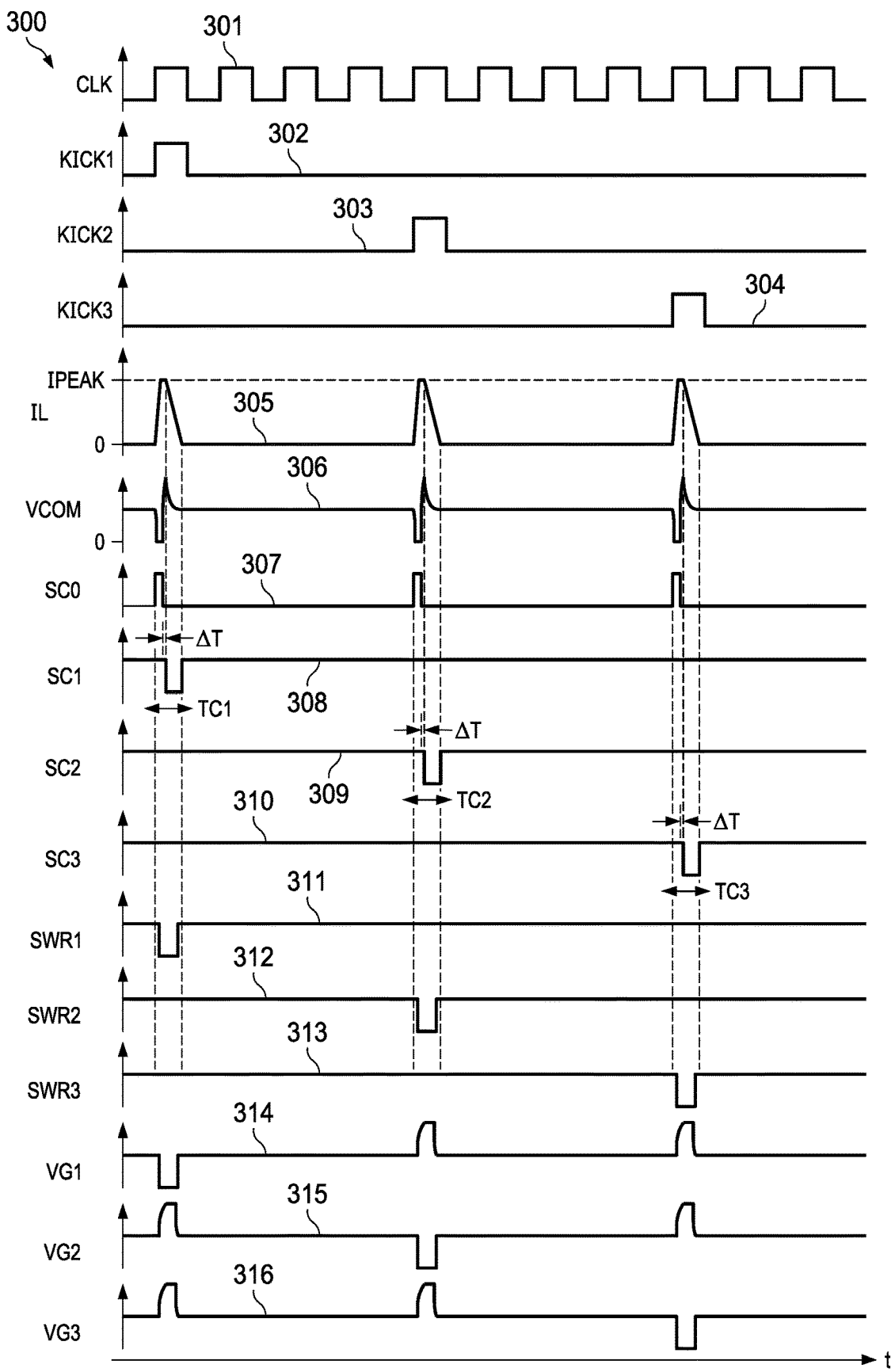
FIG. 3 is a signal diagram of signals in the PMIC and controller of FIGS. 1 and 2.

Referring initially to FIGS. 1-3, FIG. 1 shows a single inductor, multiple output (SIMO) power system with an electronic device 100, for example, an integrated circuit (IC), in one implementation, a power management integrated circuit (PMIC), having low leakage output circuits. FIG. 2 shows an example controller in the electronic device 100 of FIG. 1 and FIG. 3 illustrates signals in the electronic device 100 and the controller of FIGS. 1 and 2. In one example, the electronic device 100 includes three output channels, each having an associated output. Other implementations include any integer number N output channels, where N is greater than 1. The illustrated example implements a series of power transfer cycles, during which one of the output channels is selected for power transfer and the remaining channels are referred to herein as non-selected channels for that power transfer cycle. In operation in one implementation, one channel is selected for each power transfer cycle based on a selection criteria, such as the output channel with a corresponding output voltage that is furthest away from a regulation target or setpoint, the output channel having a largest output current draw, or other selection criteria, including simple sequential selection of the N channels in each set of N power transfer cycles. In the illustrated example with three output channels, one channel is selected for power transfer and the remaining two channels are referred to as non-selected channels for that power transfer cycle.

The electronic device 100 includes a transistor 101. The transistor 101 in the illustrated example is an n-channel FET (e.g., NFET) transistor that has a source 102, a drain 103 and a gate 104. The transistor 101 also includes a substrate connection 105 that is coupled to the source 102. In other implementations, a different type or form of transistor 101 can be used, such as a p-channel FET, a bipolar transistor, etc. The transistor 101 is configured as a low-side switch, in which the source 102 is coupled to a reference voltage VSS at a reference node 106 and the drain 103 that forms a shared or common output node having a voltage VCOM.

The drain 103 of the transistor 101 is adapted to be coupled to an inductor 107. In the illustrated example, the inductor 107 is external to the electronic device 100 and the electronic device 100 includes respective first and second inductor terminals 108 and 109 to allow electrical connection of the external inductor 107 to the circuitry of the electronic device 100. In this example, the electronic device 100 includes conductive metal terminals, such as leads, pins, or pads that can be soldered to a substrate, such as a printed circuit board (PCB, not shown) for electrical interconnection of the circuitry of the electronic device 100 with other components of the host PCB, including electrical connection to the terminals of the external inductor 107 in the example of FIG. 1. Also, the electronic device 100 provides a terminal 106 for connection to the reference node (e.g., VSS).

The electronic device 100 includes multiple output circuits associated with respective outputs to drive associated loads. The illustrated example includes a first output circuit 110 associated with a first output channel. The first output circuit 110 includes a first output transistor 111. The first output transistor 111 in the illustrated example is a p-channel FET having a source 112, a drain 113 and a gate 114 with a first gate voltage VG1. The first output transistor 111 also includes a substrate connection 115 that is coupled to the drain 113. The source 112 is coupled to the shared or common node at the drain 103 of the low side transistor 101. The drain 113 of the first output transistor 111 is coupled to a first output node 116. The first output circuit 110 has a first switch control input 117 that is configured to receive a first switch control signal SC1 to operate the first output transistor 111. The electronic device 100 also includes a first output 118 coupled to the first output node 116 and to the drain 113 of the first output transistor 111 for connection to an external first load.

The first output transistor 111 operates according to the first switch control signal SC1 to selectively connect the first output node 116 to the shared or common node at the drain 103 of the transistor 101 to conduct current from the inductor 107 to the first output 118 during power transfer cycles in which the first output channel is selected, in order to provide a first output voltage signal VOUT1 at the first output 118. In one example, the first switch control signal SC1 is provided by a controller described below that provides closed loop regulation of the first output voltage signal VOUT1, although not a requirement of all possible implementations. In another example, the first output voltage signal VOUT1 is provided according to the first switch control signal SC1 using open loop control.

The first output circuit 110 also includes a first bypass control input 119 and a first output control circuit 120. The first bypass control input 119 is configured to receive a first bypass control signal SWR1 that selectively bypasses an RC circuit resistor of the first output control circuit 120. The first output control circuit 120 includes a first resistor 121 with a first terminal 122 and a second terminal 123. Also, the first output control circuit 120 includes a first switch 124 with a first terminal 125, a second terminal 126 and a control input coupled to the first bypass control input 119. In one example, the first switch 124 is a transistor, such as an FET or a bipolar transistor. The first output control circuit 120 also includes a first capacitor 127 having a first terminal 128 and a second terminal 129.

The first resistor 121 and the first switch 124 are coupled in parallel with one another between the first switch control input 117 and the gate 114 of the first output transistor 111. Also, the first capacitor 127 is coupled between the source 112 of the first output transistor 111 and the gate 114 of the first output transistor 111. The first terminal 122 of the first resistor 121 is coupled to the first switch control input 117. The second terminal 123 of the first resistor 121 is coupled to the gate 114 of the first output transistor 111. The first terminal 125 of the first switch 124 is coupled to the first terminal 122 of the first resistor 121. The second terminal 126 of the first switch 124 is coupled to the second terminal 123 of the first resistor 121. The control terminal of the first switch 124 is coupled to the first bypass control input 119. The first terminal 128 of the first capacitor 127 is coupled to the second terminal 123 of the first resistor 121. The second terminal of the first capacitor 127 is coupled to the source 112 of the first output transistor 111.

When the first output channel is not selected during a given power transfer cycle, the first switch 124 is kept open responsive to an appropriate state of the first bypass control signal SWR1. In this state, a subsequent rise in the voltage VCOM of the shared or common node at the drain 103 of the transistor 101 causes a temporary rise in the gate voltage VG1 at the gate 114 of the first output transistor 111, which mitigates or avoids undesired turn on of the first output transistor 111. In contrast, when the first output channel is selected during a given power transfer cycle, the first bypass control signal SWR1 is placed in a state that closes the first switch 124, which causes the first switch 124 to bypass the first resistor 121 and a subsequent falling edge of the first switch control signal SC1 causes a drop in the gate voltage VG1 at the gate 114 of the first output transistor 111, which turns the first output transistor 111 on to allow current to flow to the first output 118 from the inductor terminal coupled to the shared or common node at the drain 103 of the transistor 101.

The electronic device 100 also includes a second output circuit 130 associated with a second output channel. The second output circuit 130 includes a second output transistor 131. The second output transistor 131 in the illustrated example is a p-channel FET having a source 132, a drain 133 and a gate 134 with a second gate voltage VG2. The second output transistor 131 also includes a substrate connection 135 that is coupled to the drain 133. The source 132 is coupled to the shared or common node at the drain 103 of the low side transistor 101. The drain 133 of the second output transistor 131 is coupled to a second output node 136. The second output circuit 130 has a second switch control input 137 that is configured to receive a second switch control signal SC2 to operate the second output transistor 131. The electronic device 100 also includes a second output 138 coupled to the second output node 136 and to the drain 133 of the second output transistor 131 for connection to an external second load.

The second output transistor 131 operates according to the second switch control signal SC2 to selectively connect the second output node 136 to the shared or common node at the drain 103 of the transistor 101 to conduct current from the inductor 107 to the second output 138 during power transfer cycles in which the second output channel is selected, in order to provide a second output voltage signal VOUT2 at the second output 138. In one example, the second switch control signal SC2 is provided by a controller described below that provides closed loop regulation of the second output voltage signal VOUT2, although not a requirement of all possible implementations. In another example, the second output voltage signal VOUT2 is provided according to the second switch control signal SC2 using open loop control.

The second output circuit 130 also includes a second bypass control input 139 and a second output control circuit 140. The second bypass control input 139 is configured to receive a second bypass control signal SWR2 that selectively bypasses an RC circuit resistor of the second output control circuit 140. The second output control circuit 140 includes a second resistor 141 with a first terminal 142 and a second terminal 143. Also, the second output control circuit 140 includes a second switch 144 with a first terminal 145, a second terminal 146 and a control input coupled to the second bypass control input 139. In one example, the second switch 144 is a transistor, such as an FET or a bipolar transistor. The second output control circuit 140 also includes a second capacitor 147 having a first terminal 148 and a second terminal 149.

The second resistor 141 and the second switch 144 are coupled in parallel with one another between the second switch control input 137 and the gate 134 of the second output transistor 131. Also, the second capacitor 147 is coupled between the source 132 of the second output transistor 131 and the gate 134 of the second output transistor 131. The first terminal 142 of the second resistor 141 is coupled to the second switch control input 137. The second terminal 143 of the second resistor 141 is coupled to the gate 134 of the second output transistor 131. The first terminal 145 of the second switch 144 is coupled to the first terminal 142 of the second resistor 141. The second terminal 146 of the second switch 144 is coupled to the second terminal 143 of the second resistor 141. The control terminal of the second switch 144 is coupled to the second bypass control input 139. The first terminal 148 of the second capacitor 147 is coupled to the second terminal 143 of the second resistor 141. The second terminal of the second capacitor 147 is coupled to the source 132 of the second output transistor 131.

When the second output channel is not selected during a given power transfer cycle, the second switch 144 is kept open responsive to an appropriate state of the second bypass control signal SWR2. In this state, a subsequent rise in the voltage VCOM of the shared or common node at the drain 103 of the transistor 101 causes a temporary rise in the gate voltage VG2 at the gate 134 of the second output transistor 131, which mitigates or avoids undesired turn on of the second output transistor 131. In contrast, when the second output channel is selected during a given power transfer cycle, the second bypass control signal SWR2 is placed in a state that closes the second switch 144, which causes the second switch 144 to bypass the second resistor 141 and a subsequent falling edge of the second switch control signal SC2 causes a drop in the gate voltage VG2 at the gate 134 of the second output transistor 131, which turns the second output transistor 131 on to allow current to flow to the second output 138 from the inductor terminal coupled to the shared or common node at the drain 103 of the transistor 101.

The electronic device 100 also includes a third output circuit 150 associated with a third output channel. The third output circuit 150 includes a third output transistor 151. The third output transistor 151 in the illustrated example is a p-channel FET having a source 152, a drain 153 and a gate 154 with a third gate voltage VG3. The third output transistor 151 also includes a substrate connection 155 that is coupled to the drain 153. The source 152 is coupled to the shared or common node at the drain 103 of the low side transistor 101. The drain 153 of the third output transistor 151 is coupled to a third output node 156. The third output circuit 150 has a third switch control input 157 that is configured to receive a third switch control signal SC3 to operate the third output transistor 151. The electronic device 100 also includes a third output 158 coupled to the third output node 156 and to the drain 153 of the third output transistor 151 for connection to an external third load.

The third output transistor 151 operates according to the third switch control signal SC3 to selectively connect the third output node 156 to the shared or common node at the drain 103 of the transistor 101 to conduct current from the inductor 107 to the third output 158 during power transfer cycles in which the third output channel is selected, in order to provide a third output voltage signal VOUT3 at the third output 158. In one example, the third switch control signal SC3 is provided by a controller described below that provides closed loop regulation of the third output voltage signal VOUT3, although not a requirement of all possible implementations. In another example, the third output voltage signal VOUT3 is provided according to the third switch control signal SC3 using open loop control.

The third output circuit 150 also includes a third bypass control input 159 and a third output control circuit 160. The third bypass control input 159 is configured to receive a third bypass control signal SWR3 that selectively bypasses an RC circuit resistor of the third output control circuit 160. The third output control circuit 160 includes a third resistor 161 with a first terminal 162 and a second terminal 163. Also, the third output control circuit 160 includes a third switch 164 with a first terminal 165, a second terminal 166 and a control input coupled to the third bypass control input 159. In one example, the third switch 164 is a transistor, such as an FET or a bipolar transistor. The third output control circuit 160 also includes a third capacitor 167 having a first terminal 168 and a second terminal 169.

The third resistor 161 and the third switch 164 are coupled in parallel with one another between the third switch control input 157 and the gate 154 of the third output transistor 151. Also, the third capacitor 167 is coupled between the source 152 of the third output transistor 151 and the gate 154 of the third output transistor 151. The first terminal 162 of the third resistor 161 is coupled to the third switch control input 157. The second terminal 163 of the third resistor 161 is coupled to the gate 154 of the third output transistor 151. The first terminal 165 of the third switch 164 is coupled to the first terminal 162 of the third resistor 161. The second terminal 166 of the third switch 164 is coupled to the second terminal 163 of the third resistor 161. The control terminal of the third switch 164 is coupled to the third bypass control input 159. The first terminal 168 of the third capacitor 167 is coupled to the second terminal 163 of the third resistor 161. The second terminal of the third capacitor 167 is coupled to the source 152 of the third output transistor 151.

When the third output channel is not selected during a given power transfer cycle, the third switch 164 is kept open responsive to an appropriate state of the third bypass control signal SWR3. In this state, a subsequent rise in the voltage VCOM of the shared or common node at the drain 103 of the transistor 101 causes a temporary rise in the gate voltage VG3 at the gate 154 of the third output transistor 151, which mitigates or avoids undesired turn on of the third output transistor 151. In contrast, when the third output channel is selected during a given power transfer cycle, the third bypass control signal SWR3 is placed in a state that closes the third switch 164, which causes the third switch 164 to bypass the third resistor 161 and a subsequent falling edge of the third switch control signal SC3 causes a drop in the gate voltage VG3 at the gate 154 of the third output transistor 151, which turns the third output transistor 151 on to allow current to flow to the third output 158 from the inductor terminal coupled to the shared or common node at the drain 103 of the transistor 101.

The electronic device 100 also includes a controller 170 having a first switch control output 171 coupled to the first switch control input 117 to provide the first switch control signal SC1, a second switch control output 172 coupled to the second switch control input 137 to provide the second switch control signal SC2 and a third switch control output 173 coupled to the third switch control input 157 to provide the third switch control signal SC3. The controller 170 in one example is or includes a programmed processor, a logic circuit, or other digital control circuitry or combinations thereof. The controller 170 in one example includes circuits (e.g., analog to digital converter or ADC circuits, analog multiplexers, resistive and/or capacitive divider circuits, signal conditioning circuits, filter circuits, etc., not shown) configured to receive and quantify analog input signals, such as feedback signals VOUT1, VOUT2 and VOUT3 for closed loop regulation of the channel output voltages, as well as an analog input to receive and quantify an input voltage signal VIN at an input voltage terminal 174 of the electronic device 100. The electronic device 100 also includes a current sensor 194 configured to sense an inductor current IL of the inductor 107 and to provide an inductor current feedback signal ILFB to the controller 170.

The electronic device 100 also includes an internal high side switch SH coupled between the first inductor terminal 108 and the reference voltage terminal 106, as well as an internal low side switch SL coupled between the reference voltage terminal 106 and the an input voltage terminal 174 of the electronic device 100. The internal high side switch SH in one example is controlled by the controller 170 to be closed and the internal low side switch SL is controlled by the controller 170 to be open during normal operation for a boost converter configuration of the electronic device 100. In other configurations, the controller 170 actively operates one or both of the switches SH and/or SL, or holds one or both of the switches SH and/or SL in different states, for example, to implement a buck converter, a buck-boost converter, etc.

In the illustrated example, for a frequency controlled SIMO boost converter, the input voltage terminal 174 is coupled to a DC voltage supply or source (not shown), the switch SH is held closed by the controller 170, the switch SL is held open by the controller 170, the first output 118 is coupled to a first load 191, the second output 138 is coupled to a second output load 192 and the third output 158 is coupled to a third load 193.

In one example, the controller 170 is configured by circuit design and/or programming to generate the switch control signals SC0, SC1, SC2 and SC3 and the bypass control signals SWR1, SWR2 and SWR3 as shown in FIG. 3. Also, the controller 170 implements channel selection functions and closed loop feedback peak current control according to the inductor current feedback signal ILFB, as well as frequency control to implement regulation of the output voltages VOUT1, VOUT2 and VOUT3 using a series of power transfer cycles.

FIG. 2 shows an example implementation of the controller 170 in the electronic device 100 of FIG. 1. The controller 170 in this implementation includes a digital controller 200, such as a logic circuit that is a programmable processor in one example. In another example, the digital controller 200 is a logic circuit or a state machine. The digital controller 200 in one example also includes ADC converters to receive and quantify analog input signals. The controller 170 in FIG. 2 also includes an input voltage monitor circuit 210 (labeled VIN MONITOR in FIG. 2) with an input that receives the input voltage signal VIN (e.g., from the terminal 174 in FIG. 1) and generates a Boolean input voltage monitor status signal VIM that indicates to the digital controller 200 whether the input voltage signal VIN is high enough for desired operation of the power converter. In one example, the input voltage monitor begins operation at startup and the digital controller closes the internal high side switch SH in FIG. 1 responsive to the input voltage signal VIN reaching a predetermined threshold. Thereafter, the digital controller 200 selectively opens the internal high side switch SH and discontinues power converter operation responsive to the input voltage monitor status signal VIM changing state to indicate that the input voltage signal VIN is insufficient for further power converter operation.

Continuing in FIG. 2, the controller 170 also includes a peak detection circuit 220 and a zero current detection circuit 230, both coupled to receive the inductor current feedback signal ILFB from the sensor 194 in FIG. 1. The peak detection circuit 220 provides a peak detect Boolean output signal PKD to the digital controller 200 responsive to the inductor current IL reaching a peak value. The zero current detection circuit 230 provides a zero current detect signal ZCD to the digital controller 200 responsive to the inductor current IL reaching zero. In one implementation, the digital controller 200 turns on the transistor 101 to begin a charging cycle of the inductor 107 and turns the transistor 101 off responsive to the peak detect output signal PKD. In this example, moreover, the digital controller 200 subsequently turns the selected output transistor (e.g., 111, 131 or 151) off in a given power transfer cycle responsive to the zero current detect signal ZCD.

The controller 170 in FIG. 2 also includes capacitor divider circuitry and comparators 240, having a capacitor divider circuit for each respective output voltage signal VOUT1, VOUT2, VOUT3. A bandgap reference circuit 250 includes an output 252 that provides a reference voltage signal to the capacitor divider circuits and comparators 240. In this example, the circuit 240 includes three comparators associated with respective ones of the output channels. The individual comparators in one implementation include a first input coupled to the bandgap reference output 252 in order to receive the reference voltage signal, and a second input coupled to a respective one of the capacitor divider circuits to receive a divided voltage signal corresponding to the respective one of the output voltage signals VOUT1, VOUT2 and VOUT3. The circuit 240 provides Boolean output signals KICK1, KICK2 and KICK3 to the digital controller 200. The output signals KICK1, KICK2 and KICK3 correspond to the respective output channels of the electronic device 100 indicating that the respective output voltage signal VOUT1, VOUT2 and VOUT3 have an amplitude indicating that further charging is desirable for closed-loop output voltage regulation of the associated channel. The controller 170 also includes an oscillator 260 having an output 262 that provides a clock signal CLK to the digital controller 200.

The digital controller 200 provides switching control outputs to level shift and driver circuits 270, which generate the switch control signals SC0, SC1, SC2 and SC3, as well as the bypass control signals SWR1, SWR2 and SWR3. The digital controller 200 in one example adjusts the operating frequency of the SIMO power conversion by providing a frequency control signal FREQCON to an input of the oscillator 260 to set the operating frequency of the clock signal CLK. In one example, the digital controller 200 sets the frequency of the clock signal CLK to a lowest value that facilitates a desired level of closed loop regulation of the output voltages VOUT1, VOUT2 and VOUT3, and raises the frequency as needed to accommodate increasing output loading or decreases the frequency responsive to reduced output loading.

FIG. 3 shows a signal diagram 300 that illustrates example signals in the electronic device 100 and controller 170 of FIGS. 1 and 2. The signal diagram 300 includes a clock signal curve 301 (CLK), curves 302, 303 and 304 that show the respective KICK1, KICK2 and KICK3 signals, an inductor current curve 305 (IL) indicating an example peak current level IPEAK and a curve 306 that shows the voltage VCOM of the shared or common output node at the drain of the transistor 101 in FIG. 1. Also, the signal diagram 300 includes a curve 307 that shows the switch control signal SC0 provided to the gate of the transistor 101 used for charging the inductor 107, as well as curves 308, 309 and 310 that show the respective switch control signals SC1, SC2 and SC3 provided to the gates of the output transistors 111, 131 and 151. The signal diagram 300 also includes curves 311, 312 and 313 that show the respective bypass control signals SWR1, SWR2 and SWR3 provided to the gates of the switches 124, 144 and 164, as well as curves 314, 315 and 316 that show the respective output transistor gate voltages VG1, VG2 and VG3.

The example operation illustrated in FIG. 3 includes a first power transfer cycle TC1 that transfers the current IL from the inductor 107 to the first output 118 through the first output transistor 111. In this power transfer cycle TC1, the controller 170 generates the charging control signal SC0 at the charging switch control output 180 (e.g., curve 307 goes high in this example) that turns the transistor 101 on for a non-zero time and then turns the transistor 101 off (e.g., curve 307 goes low) responsive to a detected peak current IPEAK of the inductor 107 (e.g., curve 305 reaches the peak current value IPEAK). The voltage VCOM at the shared or common node at the drain 103 of the transistor 101 goes to zero (e.g., VSS) responsive to the transistor 101 turning on (e.g., curve 306 goes to 0 in FIG. 3). Because the first inductor terminal 108 of the electronic device 100 and the first terminal of the connected inductor 107 are coupled to a non-zero input voltage VIN, the inductor current IL (curve 305) rises responsive to the transistor 101 turning on. Responsive to the transistor 101 turning off (e.g., curve 307 going low), the voltage VCOM at the shared or common node at the drain 103 of the transistor 101 rises (curve 306).

In the illustrated implementation, the digital controller 200 of FIG. 2 implements power transfer during time periods that include four cycles of the clock signal CLK (curve 301), where the time periods are individually associated with one of the power converter output channels. In a given assigned four clock time period, the associated output channel will implement a power transfer cycle to the corresponding output if the capacitor divider and comparators circuit 240 actuates the corresponding KICK signal, indicating that the associated output voltage signal is below the reference threshold, and that power should be provided to that output channel for closed loop regulation of the output voltage. In the example of FIG. 3, each of the output channels undergo a power transfer cycle (e.g., TC1, TC2 and TC3) in their own respective four clock time period, indicated by the respective KICK1, KICK2 and KICK3 signal pulses. In this implementation, if the associated comparator circuitry 240 does not assert the KICK signal for a given output channel in the associated four clock time period, no power transfer cycle is initiated for that time period. In other implementations, the controller 170 implements different selection criteria for determining the selected channel for a given power transfer cycle.

In this example, while the charging control signal SC0 is high in the first power transfer cycle TC1, the controller 170 generates the first bypass control signal SWR1 (e.g., curve 311 goes low in this example) at the first bypass control output 181 to close the first switch 124 for the selected output channel, which bypasses (e.g., short circuits) the first resistor 121 in the first output control circuit 120. The controller 170 also generates the respective second and third bypass control signals SWR2 and SWR3 (e.g., curves 312 and 313 remain high) at the second and third bypass control outputs 182 and 183 to keep the second and third switches 144 and 164 open and the second and third resistors 141 and 161 remain in the non-selected second and third output control circuits 140 and 160 in FIG. 1.

With the switch 124 of the selected channel turned on, the controller 170 turns the first output transistor 111 of the selected output channel on by generating the first switch control signal SC1 that turns the first output transistor 111 on at the first switch control output 171 (e.g., curve 308 goes low). The selected channel output transistor 111 turning on causes the inductor current IL (e.g., curve 305) to decrease as charge is transferred through the first output transistor 111 to the associated first output 118. The zero current detection circuit 230 (FIG. 2) monitors the inductor current feedback signal ILFB and asserts the zero current detection signal ZCD responsive to the inductor current IL reaching zero. The controller 170 changes the state of the first switch control signal SC1 to turn the first output transistor 111 off responsive to the CCD signal indicating the inductor current IL has reached zero. Also, the controller 170 in this example generates the first switch control signal SC1 that turns the first output transistor 111 on a non-zero delay time ΔT after the charging control signal SC0 turns the transistor 101 off, as shown in FIG. 3 between the curves 307 and 308 during the first power transfer cycle TC1. The non-zero delay time ΔT prevents short-circuiting the associated first output 118 to the reference node 106, because the first transistor 101 is turned off before the selected first output transistor 111 is turned on.

In the illustrated example, moreover, the controller 170 generates the bypass control signal SWR1 that closes the first switch 124 from a time during which the charging control signal SC0 turns the transistor 101 on until a time during which the first switch control signal SC1 turns the first output transistor 111 on. With the second and third switches 144 and 164 open, the gate voltages VG2 and VG3 of the respective non-selected second and third channels (e.g., curves 315 and 316) rise responsive to the rise in the voltage VCOM at the shared or common node at the drain 103 of the transistor 101 rises (curve 306), due to charging of the associated second and third capacitors 147 and 167 through the respective second and third resistors 141 and 161. The raised gate voltages VG2 and VG3 of the respective non-selected second and third channels mitigate or avoid undesired turn on of the second and third output transistors 131 and 151 of the non-selected converter channels. The controller 170 then turns the selected channel bypass switch 124 off (e.g., curve 311 rises).

The output control circuits 120, 140 and 160 and the generation of the bypass control signals SWR1, SWR2 and SWR3 by the controller 170 in the electronic device 100 avoids undesired output shorting to the reference voltage VSS through the non-zero delay time ΔT between turning the transistor 101 off (curve 307) and turning the selected channel output transistor 111 on (curve 308), in combination with ensuring that the non-selected output transistors 131 and 151 remain off during the first power transfer cycle TC1. Moreover, the raised gate voltages VG2 and VG3 of the respective non-selected second and third channels are self-timed as they are responsive to the rise in the voltage VCOM at the shared or common node at the drain 103 of the transistor 101 (curve 306).

FIG. 3 further shows a second power transfer cycle TC2, in which the second output channel is selected, and the comparator and divider circuits and comparators 240 in FIG. 2 assert the associated KICK2 signal (e.g., high-going pulse in curve 303). The circuitry of the electronic device 100 operates in similar fashion to the above-described first power transfer cycle TC1. The controller 170 turns the low side charging transistor 101 on to charge the inductor 107, turns the bypass switch 144 on to bypass the gate circuit resistor 141 of the selected second channel, turns the low side charging transistor 101 off while the bypass switch 144 is kept on, turns the selected output transistor 131 on after a non-zero delay time ΔT following the low side charging transistor 101 being turned off, turns the bypass switch 144 off for the selected second channel after turning the selected output transistor 131 on and turns the selected output transistor 131 off responsive to the detected zero current condition of the inductor current IL.

The electronic device 100 operates in similar fashion for a third power transfer cycle TC3, in which the controller 170 turns the low side charging transistor 101 on to charge the inductor 107, turns the bypass switch 164 on to bypass the gate circuit resistor 161 of the selected third output channel, turns the low side charging transistor 101 off while the bypass switch 164 is kept on, turns the selected output transistor 151 on after a non-zero delay time ΔT following the low side charging transistor 101 being turned off, turns the bypass switch 164 off for the selected third channel after turning the selected output transistor 131 on and turns the selected output transistor 131 off responsive to the detected zero current condition of the inductor current IL.

Figure 4:
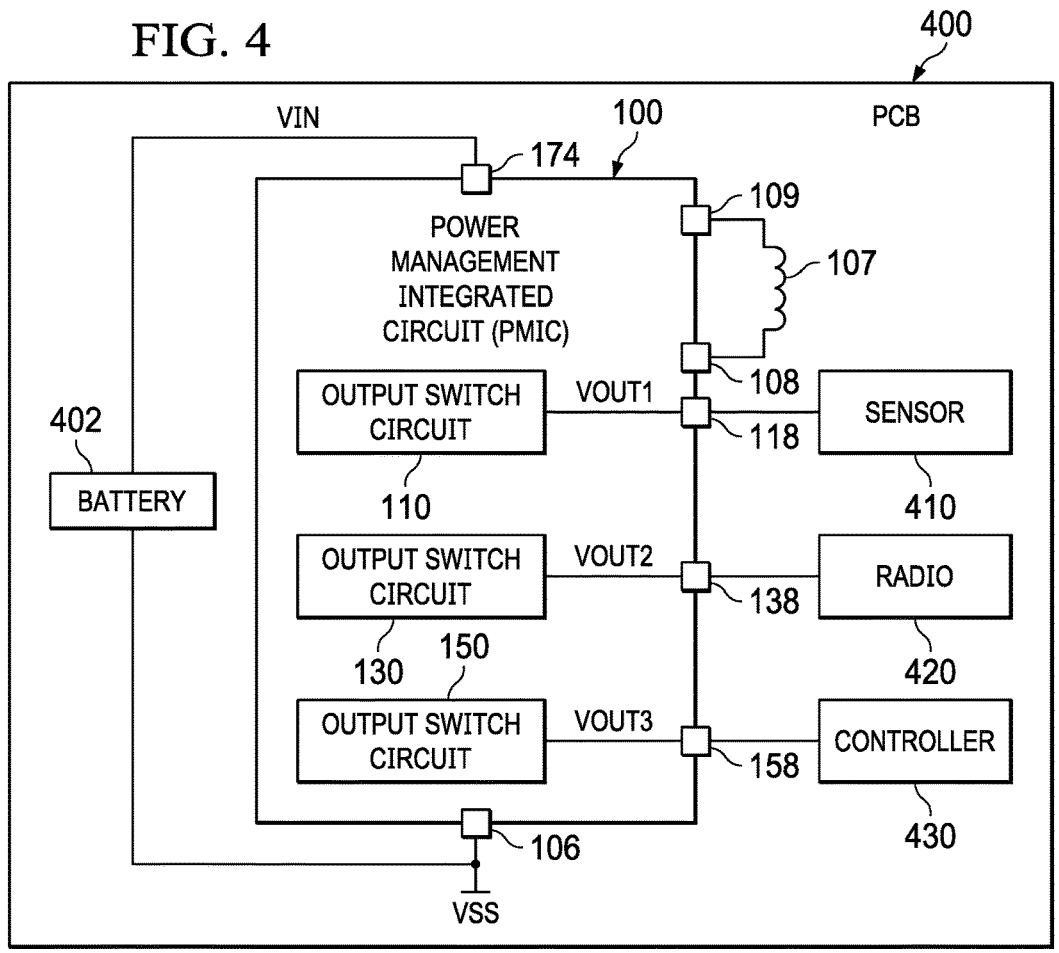
FIG. 4 is a schematic diagram of a sensor system having the PMIC of FIG. 1.

FIG. 4 shows an example nanopower sensor system implemented on a printed circuit board (PCB) 400, which includes the power management integrated circuit electronic device 100 described above. The PCB 400 in this example includes a power conversion system that operates with an installed battery 402 or other DC voltage source that supplies the DC input voltage VIN to the input 174 of the electronic device 100. The system also includes the inductor 107 with terminals soldered to the PCB 400 and circuit board traces provide an electrical connection of the inductor terminals to the terminals 108 and 109 of the electronic device 100. In this example, moreover, a sensor 410, a radio circuit 420 and a controller circuit (e.g., microcontroller) 430 are soldered to corresponding pads or through holes of the PCB 400 and are powered by connection to the respective outputs 118, 138 and 158 of the electronic device 100. The electronic device 100 includes the output circuits 110, 130 and 150 operated by the controller 170 of FIGS. 1 and 2 as described above for low or zero cross-regulation and high reliability. The power management IC implementation of the electronic device 100 facilitates low power multiple output performance for the system to provide energy efficiency and adaptability to different output specifications that are individually programmable in a range of 1.0 VDC to 5.3 VDC for a boost or buck-boost SIMO configuration. In one example, the controller 170 regulates the first output voltage VOUT1 to 5 VDC to power the sensor 410, regulates the second output voltage VOUT2 is regulated to 3.0 VDC to power the radio circuit 420 and regulates the third output voltage VOUT3 to 1.8 VDC to power the controller 430 based on a battery input voltage VIN of 1.6 to 5.5 VDC.

Figure 5:
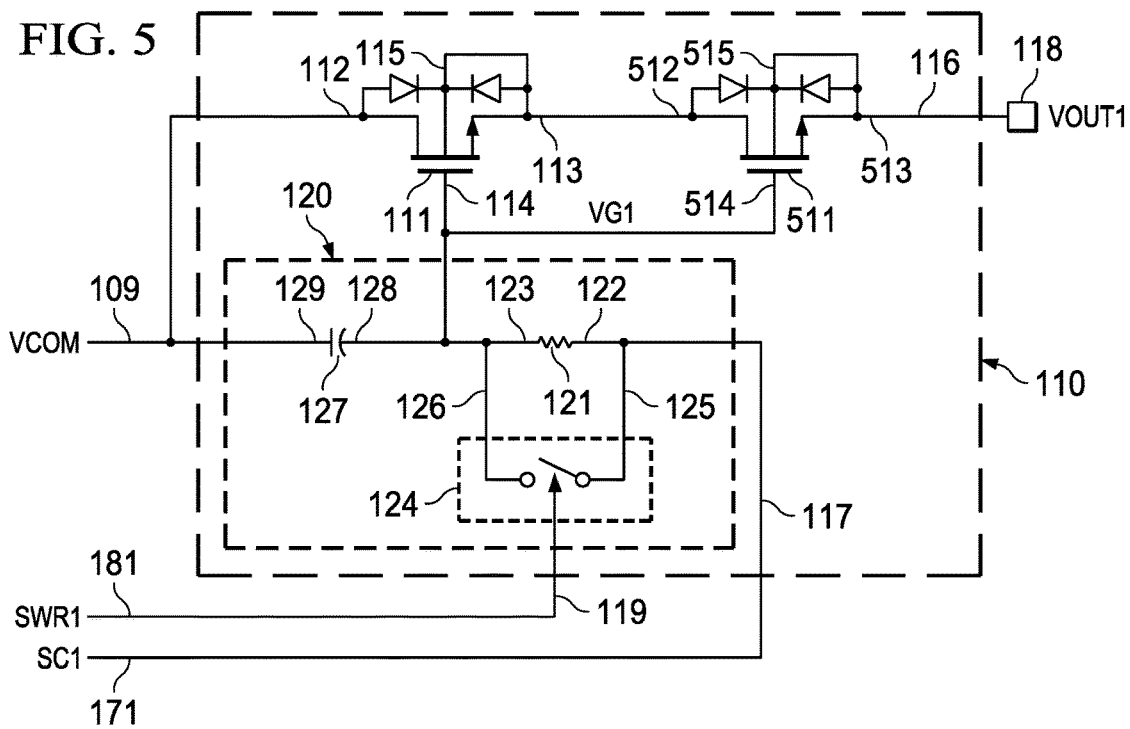
FIG. 5 is a schematic diagram of another example output circuit.

FIG. 5 is a schematic diagram of another example implementation of an output circuit 110, which can be used for any of the output circuits 110, 130 and/or 150 in the electronic device 100. The first output circuit 110 in FIG. 5 includes a third output transistor 511 coupled between the first output transistor 111 and the first output 118. The third output transistor 511 in this example is a p-channel field effect transistor having a source 512, a drain 513 and a gate 514. The source 512 of the third output transistor 511 is coupled to the drain 113 of the first output transistor 111, the drain 513 of the third output transistor 511 is coupled to the first output 118 and the gate 514 of the third output transistor 511 is coupled to the gate 114 of the first output transistor 111. In one implementation, the second output circuit 130 has a fourth output transistor, such as p-channel FET coupled between the second output transistor 131 and the second output 138 and the third output circuit 150 has a fifth output transistor, such as p-channel FET coupled between the third output transistor 151 and the third output 158.

Figure 6:
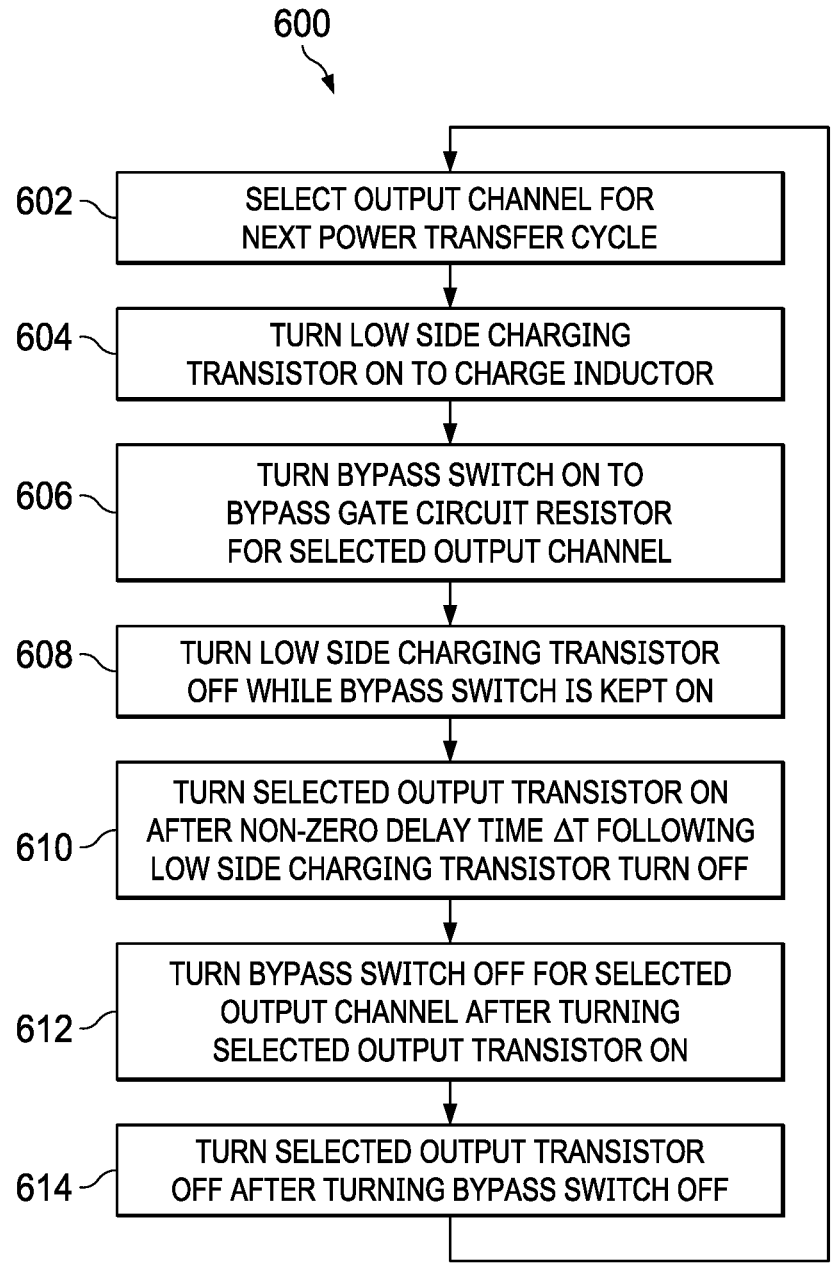
FIG. 6 is a flow diagram of a method for operating a single inductor, multiple output power converter.

FIG. 6 shows a method 600 for operating a single inductor, multiple output power converter. In one example, the controller 170 of the electronic device 100 operates according to the method 600. The flow diagram in FIG. 6 shows the method 600 for a single power transfer cycle (e.g., TC1, TC2, or TC3 above). In a given power transfer cycle, the method 600 includes selecting an output channel at 602 and turning the charging transistor 101 on to charge the inductor 107 at 604. The method 600 further includes turning a bypass switch of the selected channel on at 606 while the charging transistor 101 is turned on to bypass a gate control circuit resistor of the selected channel. The method 600 also includes turning the charging transistor 101 off at 608 after turning the bypass switch of the selected channel on.

At 610, after turning the bypass switches of the non-selected channel on, the method includes turning the output transistor of the selected output channel on to transfer current from the inductor to the load of the selected output channel. In one example, the selected channel output transistor is turned on at 610 to transfer the current from the inductor 107 to the selected load at the non-zero delay time ΔT after turning the charging transistor 101 off. At 612, after the output transistor of the selected output channel is turned on, the method 600 includes turning the bypass switch of the selected channel off. In one example, the bypass switch of the selected channel is turned off before turning the output transistor of the selected output channel off. The method 600 further includes turning the output transistor of the selected output channel off at 614 responsive to a detected zero current IL of the inductor 107. The method 600 then repeats for subsequent power transfer cycles.

Modifications are possible in the described examples and other implementations are possible, within the scope of the claims.

What is claimed is:

1. An electronic device, comprising:
    a transistor having a source, a drain and a gate, the source coupled to a reference voltage, the drain adapted to be coupled to an inductor;
    a first output circuit having a first switch control input, a first bypass control input, a first output transistor and a first output control circuit, the first output transistor having a source, a drain and a gate, the source of the first output transistor coupled to the drain of the transistor and the drain of the first output transistor coupled to a first output, the first output control circuit having a first resistor, a first switch and a first capacitor, the first resistor and the first switch coupled in parallel with one another between the first switch control input and the gate of the first output transistor and the first capacitor coupled between the source of the first output transistor and the gate of the first output transistor;
    a second output circuit having a second switch control input, a second bypass control input, a second output transistor and a second output control circuit, the second output transistor having a source, a drain and a gate, the source of the second output transistor coupled to the drain of the transistor, and the drain of the second output transistor coupled to a second output, the second output control circuit having a second resistor, a second switch and a second capacitor, the second resistor and the second switch coupled in parallel with one another between the second switch control input and the gate of the second output transistor, and the second capacitor coupled between the source of the second output transistor and the gate of the second output transistor; and
    a controller having a first switch control output, a first bypass control output, a second switch control output and a second bypass control output, the first switch control output coupled to the first switch control input, the first bypass control output coupled to the first bypass control input, the second switch control output coupled to the second switch control input, and the second bypass control output coupled to the second bypass control input.

2. The electronic device of claim 1, wherein:
    the first resistor having a first terminal and a second terminal, the first terminal of the first resistor coupled to the first switch control input, the second terminal of the first resistor coupled to the gate of the first output transistor; the first switch having a first terminal, a second terminal and a control terminal, the first terminal of the first switch coupled to the first terminal of the first resistor, the second terminal of the first switch coupled to the second terminal of the first resistor, and the control terminal of the first switch coupled to the first bypass control input; the first capacitor having a first terminal and a second terminal, the first terminal of the first capacitor coupled to the second terminal of the first resistor, and the second terminal of the first capacitor coupled to the source of the first output transistor; and
    the second resistor having a first terminal and a second terminal, the first terminal of the second resistor coupled to the second switch control input, the second terminal of the second resistor coupled to the gate of the second output transistor; the second switch having a first terminal, a second terminal and a control terminal, the first terminal of the second switch coupled to the first terminal of the second resistor, the second terminal of the second switch coupled to the second terminal of the second resistor, and the control terminal of the second switch coupled to the second bypass control input; the second capacitor having a first terminal and a second terminal, the first terminal of the second capacitor coupled to the second terminal of the second resistor, and the second terminal of the second capacitor coupled to the source of the second output transistor.

3. The electronic device of claim 2, wherein: the first output transistor is a p-channel field effect transistor; and the second output transistor is a p-channel field effect transistor.

4. The electronic device of claim 3, wherein the transistor is an n-channel field effect transistor.

5. The electronic device of claim 3, wherein:
    the first output circuit further comprises a third output transistor coupled between the first output transistor and the first output, the third output transistor being a p-channel field effect transistor and having a source, a drain and a gate, the source of the third output transistor coupled to the drain of the first output transistor, the drain of the third output transistor coupled to the first output, and the gate of the third output transistor coupled to the gate of the first output transistor; and
    the second output circuit further comprises a fourth output transistor coupled between the second output transistor and the second output, the fourth output transistor being a p-channel field effect transistor and having a source, a drain and a gate, the source of the fourth output transistor coupled to the drain of the second output transistor, the drain of the fourth output transistor coupled to the second output, and the gate of the fourth output transistor coupled to the gate of the second output transistor.

6. The electronic device of claim 2, wherein:
    the first output circuit further comprises a third output transistor coupled between the first output transistor and the first output, the third output transistor having a source, a drain and a gate, the source of the third output transistor coupled to the drain of the first output transistor, the drain of the third output transistor coupled to the first output, and the gate of the third output transistor coupled to the gate of the first output transistor; and
    the second output circuit further comprises a fourth output transistor coupled between the second output transistor and the second output, the fourth output transistor having a source, a drain and a gate, the source of the fourth output transistor coupled to the drain of the second output transistor, the drain of the fourth output transistor coupled to the second output, and the gate of the fourth output transistor coupled to the gate of the second output transistor.

7. The electronic device of claim 1, wherein:
    the first output circuit further comprises a third output transistor coupled between the first output transistor and the first output, the third output transistor having a gate coupled to the gate of the first output transistor; and
    the second output circuit further comprises a fourth output transistor coupled between the second output transistor and the second output, the fourth output transistor having a gate coupled to the gate of the second output transistor.

8. The electronic device of claim 1, wherein the controller is configured to, in a power transfer cycle that transfers current from the inductor to the first output:
generate, at the first bypass control output, a first bypass control signal that closes the first switch;
generate, at the second bypass control output, a second bypass control signal that keeps the second switch open;
generate, at the first switch control output, a first switch control signal that turns the first output transistor on; and
generate, at the second switch control output, a second switch control signal that keeps the second output transistor off.

9. The electronic device of claim 8, wherein the controller is configured to, in a second power transfer cycle that transfers the current from the inductor to the second output:
generate, at the first bypass control output, the first bypass control signal that keeps the first switch open;
generate, at the second bypass control output, the second bypass control signal that closes the second switch;
generate, at the first switch control output, the first switch control signal that keeps the first output transistor off; and
generate, at the second switch control output, the second switch control signal that turns the second output transistor on.

10. The electronic device of claim 9, wherein:
the controller comprises a charging switch control output that is coupled to the gate of the transistor;
the controller is configured to, in the power transfer cycle that transfers the current from the inductor to the first output:
generate, at the charging switch control output, a charging control signal that turns the transistor on for a non-zero time and then turns the transistor off responsive to a detected peak current of the inductor;
generate, at the first bypass control output, the first bypass control signal that closes the first switch during the power transfer cycle from a time during which the charging control signal turns the transistor on until a time during which the first switch control signal turns the first output transistor on;
generate, at the second bypass control output, the second bypass control signal that keeps the second switch open;
generate, at the first switch control output, the first switch control signal that turns the first output transistor on a non-zero delay time after the charging control signal turns the transistor off; and
generate, at the second switch control output, the second switch control signal that keeps the second output transistor off; and
the controller is configured to, in the second power transfer cycle that transfers the current from the inductor to the second output:
generate, at the charging switch control output, the charging control signal that turns the transistor on for the non-zero time and then turns the transistor off responsive to the detected peak current of the inductor;
generate, at the first bypass control output, the first bypass control signal that keeps the first switch open;
generate, at the second bypass control output, the second bypass control signal that closes the second switch open during the second power transfer cycle from a time during which the charging control signal turns the transistor on until a time during which the second switch control signal turns the second output transistor on;
generate, at the first switch control output, the first switch control signal that keeps the first output transistor off; and
generate, at the second switch control output, the second switch control signal that turns the second output transistor on the non-zero delay time after the charging control signal turns the transistor off.

11. The electronic device of claim 8, wherein:
the controller comprises a charging switch control output that is coupled to the gate of the transistor;
the controller is configured to, in the power transfer cycle that transfers the current from the inductor to the first output:
generate, at the charging switch control output, a charging control signal that turns the transistor on for a non-zero time and then turns the transistor off responsive to a detected peak current of the inductor;
generate, at the first bypass control output, the first bypass control signal that closes the first switch during the power transfer cycle from a time during which the charging control signal turns the transistor on until a time during which the first switch control signal turns the first output transistor on;
generate, at the second bypass control output, the second bypass control signal that keeps the second switch open;
generate, at the first switch control output, the first switch control signal that turns the first output transistor on a non-zero delay time after the charging control signal turns the transistor off; and
generate, at the second switch control output, the second switch control signal that keeps the second output transistor off.

12. A power conversion system, comprising:
an input adapted to be coupled to a DC voltage source;
an inductor coupled to the input;
a first output adapted to be coupled to a first load;
a second output adapted to be coupled to a second load;
a transistor having a source, a drain and a gate, the source coupled to a reference voltage, the drain coupled to the inductor;
a first output circuit having a first switch control input; a first bypass control input; a first output transistor; and a first output control circuit; the first output transistor having a source, a drain and a gate, the source of the first output transistor coupled to the drain of the transistor, and the drain of the first output transistor coupled to the first output; the first output control circuit having a first resistor, a first switch and a first capacitor, the first resistor and the first switch coupled in parallel with one another between the first switch control input and the gate of the first output transistor, and the first capacitor coupled between the source of the first output transistor and the gate of the first output transistor;
a second output circuit having a second switch control input; a second bypass control input; a second output transistor; and a second output control circuit; the second output transistor having a source, a drain and a gate, the source of the second output transistor coupled to the drain of the transistor, and the drain of the second output transistor coupled to the second output; the second output control circuit having a second resistor, a second switch and a second capacitor; the second resistor and the second switch coupled in parallel with one another between the second switch control input and the gate of the second output transistor, and the second capacitor coupled between the source of the second output transistor and the gate of the second output transistor; and a controller having a first switch control output; a first bypass control output; a second switch control output; and a second bypass control output, the first switch control output coupled to the first switch control input, the first bypass control output coupled to the first bypass control input, the second switch control output coupled to the second switch control input, and the second bypass control output coupled to the second bypass control input.

13. The power conversion system of claim 12, wherein:
the first resistor having a first terminal and a second terminal, the first terminal of the first resistor coupled to the first switch control input, the second terminal of the first resistor coupled to the gate of the first output transistor; the first switch having a first terminal, a second terminal and a control terminal, the first terminal of the first switch coupled to the first terminal of the first resistor, the second terminal of the first switch coupled to the second terminal of the first resistor, and the control terminal of the first switch coupled to the first bypass control input; the first capacitor having a first terminal and a second terminal, the first terminal of the first capacitor coupled to the second terminal of the first resistor, and the second terminal of the first capacitor coupled to the source of the first output transistor; and the second resistor having a first terminal and a second terminal, the first terminal of the second resistor coupled to the second switch control input, the second terminal of the second resistor coupled to the gate of the second output transistor; the second switch having a first terminal, a second terminal and a control terminal, the first terminal of the second switch coupled to the first terminal of the second resistor, the second terminal of the second switch coupled to the second terminal of the second resistor, and the control terminal of the second switch coupled to the second bypass control input; the second capacitor having a first terminal and a second terminal, the first terminal of the second capacitor coupled to the second terminal of the second resistor, and the second terminal of the second capacitor coupled to the source of the second output transistor.

14. The power conversion system of claim 12, wherein: the first output transistor is a p-channel field effect transistor; and the second output transistor is a p-channel field effect transistor.

15. The power conversion system of claim 12, wherein:
the first output circuit further comprises a third output transistor coupled between the first output transistor and the first output, the third output transistor being a p-channel field effect transistor and having a source, a drain and a gate, the source of the third output transistor coupled to the drain of the first output transistor, the drain of the third output transistor coupled to the first output, and the gate of the third output transistor coupled to the gate of the first output transistor; and the second output circuit further comprises a fourth output transistor coupled between the second output transistor and the second output, the fourth output transistor being a p-channel field effect transistor and having a source, a drain and a gate, the source of the fourth output transistor coupled to the drain of the second output transistor, the drain of the fourth output transistor coupled to the second output, and the gate of the fourth output transistor coupled to the gate of the second output transistor.

16. The power conversion system of claim 12, wherein the controller is configured to, in a power transfer cycle that transfers current from the inductor to the first output:
generate, at the first bypass control output, a first bypass control signal that closes the first switch;
generate, at the second bypass control output, a second bypass control signal that keeps the second switch open;
generate, at the first switch control output, a first switch control signal that turns the first output transistor on; and
generate, at the second switch control output, a second switch control signal that keeps the second output transistor off.

17. The power conversion system of claim 16, wherein:
the controller comprises a charging switch control output that is coupled to the gate of the transistor;
the controller is configured to, in the power transfer cycle that transfers the current from the inductor to the first output:
generate, at the charging switch control output, a charging control signal that turns the transistor on for a non-zero time and then turns the transistor off responsive to a detected peak current of the inductor;
generate, at the first bypass control output, the first bypass control signal that closes the first switch during the power transfer cycle from a time during which the charging control signal turns the transistor on until a time during which the first switch control signal turns the first output transistor on;
generate, at the second bypass control output, the second bypass control signal that keeps the second switch open;
generate, at the first switch control output, the first switch control signal that turns the first output transistor on a non-zero delay time after the charging control signal turns the transistor off; and
generate, at the second switch control output, the second switch control signal that keeps the second output transistor off.

18. A method, comprising, in a power transfer cycle of a power conversion system with multiple output channels:
selecting an output channel;
turning a charging transistor on to charge an inductor;
while the charging transistor is turned on, turning a bypass switch of the selected channel on to bypass a gate control circuit resistor of the selected channel;
after turning the bypass switch of the selected channel on, turning the charging transistor off;
after turning the bypass switch of the selected channel on, turning an output transistor of the selected output channel on to transfer current from the inductor to a load of the selected output channel;
after the output transistor of the selected output channel is turned on, turning the bypass switch of the selected channel off; and
turning the output transistor of the selected output channel off responsive to a detected zero current of the inductor.

19. The method of claim 18, comprising turning the output transistor of the selected output channel on to transfer the current from the inductor to the load of the selected output channel a non-zero delay time after turning the charging transistor off.

20. The method of claim 18, comprising turning the bypass switch of the selected channel off before turning the output transistor of the selected output channel off.

* * * * *